US012775606B2

(12) United States Patent
Liu et al.

(10) Patent No.: US 12,775,606 B2
(45) Date of Patent: Oct. 27, 2026

(54) DATA PROCESSING METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Qucheng Liu, Shenzhen (CN); Zongyou Wang, Shenzhen (CN); Gengliang Zhu, Shenzhen (CN); Yifang Shi, Shenzhen (CN); Hanqing Liu, Shenzhen (CN); Zhiyong Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 4 days.

(21) Appl. No.: 18/490,697

(22) Filed: Oct. 19, 2023

(65) Prior Publication Data

US 2024/0045849 A1 Feb. 8, 2024

Related U.S. Application Data

(63) Continuation of application No. PCT/CN2023/101379, filed on Jun. 20, 2023.

(30) Foreign Application Priority Data

Jul. 7, 2022 (CN) ......................... 202210797362.2

(51) Int. Cl.
*G06F 16/22* (2019.01)
*H04L 9/00* (2022.01)

(52) U.S. Cl.
CPC ............ *G06F 16/2255* (2019.01); *H04L 9/50* (2022.05)

(58) Field of Classification Search
CPC .. G06F 16/2255; G06F 16/2228; G06F 16/22; G06F 16/13; G06F 16/137;
(Continued)

(56) References Cited

U.S. PATENT DOCUMENTS

| | | | | |
|---|---|---|---|---|
| 11,106,487 | B2 * | 8/2021 | Xie | G06Q 20/023 |
| 11,663,090 | B2 * | 5/2023 | Davis | G06F 11/1464 707/685 |

(Continued)

FOREIGN PATENT DOCUMENTS

| | | | | |
|---|---|---|---|---|
| CN | 106603198 A | * 4/2017 | | H04L 1/0076 |
| CN | 108958925 A | * 12/2018 | | G06F 9/5072 |

(Continued)

OTHER PUBLICATIONS

Blake et al., "Bloom Filter Guided Transaction Scheduling", Feb. 12, 2011, HPCA '11: Proceedings of the 2011 IEEE 17th International Symposium on High Performance Computer Architecture; pp. 75-86 (Year: 2011).*

(Continued)

*Primary Examiner* — Boris Gorney
*Assistant Examiner* — Robert F May
(74) *Attorney, Agent, or Firm* — Anova Law Group, PLLC

(57) ABSTRACT

A data processing method includes: obtaining a plurality of groups of transaction data to be processed; determining, from the plurality of groups of transaction data according to transaction execution results of the plurality of groups of transaction data, at least one group of first transaction data that meets a preset execution condition; packaging the plurality of groups of transaction data, to generate a consensus-pending block, the consensus-pending block recording the at least group of first of first transaction data and at least one group of second transaction data, and the second
(Continued)

transaction data being transaction data different from the first transaction data among the plurality of groups of transaction data; and performing first consensus processing on the first transaction data, and performing second consensus processing, different from the first consensus processing, on the second transaction data.

16 Claims, 6 Drawing Sheets

(58) Field of Classification Search
CPC ...... G06F 16/152; G06F 16/31; G06F 16/316; G06F 16/325; H04L 9/50
See application file for complete search history.

(56) References Cited

U.S. PATENT DOCUMENTS

| | | | | |
|---|---|---|---|---|
| 2010/0287554 | A1* | 11/2010 | Amundsen | G06F 9/5038 718/101 |
| 2012/0179877 | A1 | 7/2012 | Shriraman et al. | |
| 2017/0344435 | A1* | 11/2017 | Davis | H04L 9/3239 |
| 2019/0334920 | A1* | 10/2019 | Kelly | H04L 9/3239 |
| 2019/0386834 | A1 | 12/2019 | Furukawa | |
| 2020/0396065 | A1* | 12/2020 | Gutierrez-Sheris | H04L 12/46 |
| 2023/0108083 | A1* | 4/2023 | Ramabaja | H04L 9/50 705/75 |
| 2023/0130074 | A1* | 4/2023 | Xiao | H04L 45/46 370/389 |
| 2023/0275771 | A1* | 8/2023 | Liu | H04L 9/0819 713/168 |
| 2024/0223386 | A1* | 7/2024 | Shibata | H04L 9/50 |

FOREIGN PATENT DOCUMENTS

| | | | | | |
|---|---|---|---|---|---|
| CN | 110503558 | A | * | 11/2019 | G06F 16/23 |
| CN | 110728578 | A | | 1/2020 | |
| CN | 112381649 | A | * | 2/2021 | G06Q 40/04 |
| CN | 112508573 | A | | 3/2021 | |
| CN | 112884587 | A | * | 6/2021 | |
| CN | 113051568 | A | | 6/2021 | |
| CN | 113064730 | A | | 7/2021 | |
| CN | 113568981 | A | | 10/2021 | |
| CN | 115222395 | A | * | 10/2022 | G06Q 20/382 |
| WO | 2022041900 | A1 | | 3/2022 | |

OTHER PUBLICATIONS

The World Intellectual Property Organization (WIPO) International Search Report for PCT/CN2023/101379 Oct. 17, 2023 6 Pages (including translation).

China National Intellectual Property Administration (CNIPA) Office Action for Application No. 202210797362.2, Jun. 29, 2026, 12 Pages (including translation).

* cited by examiner

DATA PROCESSING METHOD AND APPARATUS, DEVICE, AND MEDIUM

CROSS-REFERENCES TO RELATED APPLICATIONS

This application is a continuation application of PCT Patent Application No. PCT/CN2023/101379, filed on Jun. 20, 2023, which claims the priority to Chinese patent application No. 202210797362.2, entitled "DATA PROCESSING METHOD AND APPARATUS, DEVICE, MEDIUM, AND PRODUCT", and filed with the China National Intellectual Property Administration on Jul. 7, 2022, the entire contents of both of which are incorporated herein by reference.

FIELD OF THE TECHNOLOGY

The present disclosure relates to the field of blockchain technologies, and in particular, to a data processing method and apparatus, a computer device, a computer-readable storage medium, and a computer program product.

BACKGROUND OF THE DISCLOSURE

A block can be composed of a plurality of groups of transaction data, and before a packaging node writes the block to a blockchain, consensus needs to be performed on the block separately by consensus nodes in a consensus network. In other words, these consensus nodes need to separately perform transaction verification on each group of transaction data in the block.

At present, during the transaction verification on these transaction data in the block by these consensus nodes, these transaction data (for example, transaction data 1, transaction data 2, and transaction data 3) usually need to be uniformly packaged to a block. In a consensus process, generally serial processing is performed, to ensure that each group of transaction data is processed. For example, each consensus node needs to execute the transaction data 1 before executing the transaction data 2, and after executing the transaction data 2, continues to execute the transaction data 3.

The method in which the consensus nodes execute these transaction data in the block in series is not flexible enough, which causes low consensus performance of these consensus nodes and thereby causing low throughput of the blockchain.

SUMMARY

According to various embodiments provided in the present disclosure, a data processing method and apparatus, a computer device, a computer-readable storage medium, and a computer program product are provided.

In an aspect, an embodiment of the present disclosure provides a data processing method, including: obtaining a plurality of groups of transaction data to be processed, and executing the plurality of groups of transaction data; determining, from the plurality of groups of transaction data according to transaction execution results of the plurality of groups of transaction data, at least one group of first transaction data that meets a preset execution condition; packaging the plurality of groups of transaction data, to generate a consensus-pending block, the consensus-pending block recording the at least group of first group of first transaction data and at least one group of second transaction data, and the second transaction data being transaction data different from the first transaction data among the plurality of groups of transaction data; and broadcasting the consensus-pending block to a consensus node set, so that consensus nodes in the consensus node set perform first consensus processing on each group of first transaction data and perform second consensus processing, different from the first consensus processing, on each group of second transaction data in the consensus-pending block.

In another aspect, an embodiment of the present disclosure provides a data processing method, including: obtaining a consensus-pending block transmitted by a packaging node, the consensus-pending block being generated after packaging, by the packaging node, a plurality of groups of transaction data to be processed, the consensus-pending block recording at least one group of first transaction data and at least one group of second transaction data, and the first transaction data being determined according to transaction execution results of the plurality of groups of transaction data after executing the plurality of groups of transaction data in parallel; performing first consensus processing on each group of first transaction data in the consensus-pending block, to obtain a first transaction execution result of the at least one group of first transaction data; performing second consensus processing, different from the first consensus processing, on the at least one group of second transaction data in the consensus-pending block, to obtain a second transaction execution result of each group of second transaction data; and combining the first transaction execution result and the second transaction execution result, to obtain a transaction combination execution result.

In another aspect, an embodiment of the present disclosure provides a data processing apparatus, including: an obtaining unit, configured to obtain a plurality of groups of transaction data to be processed, and execute the plurality of groups of transaction data; a processing unit, configured to determine, from the plurality of groups of transaction data according to transaction execution results of the plurality of groups of transaction data, at least one group of first transaction data that meets a preset execution condition; the processing unit being further configured to package the plurality of groups of transaction data, to generate a consensus-pending block, the consensus-pending block recording each group of first transaction data and at least one group of second transaction data, and the second transaction data being transaction data different from the first transaction data among the plurality of groups of transaction data; and a transmitting unit, configured to broadcast the consensus-pending block to a consensus node set, so that consensus nodes in the consensus node set perform first consensus processing on the at least group of first transaction data and perform second consensus processing, different from the first consensus processing, on each group of second transaction data in the consensus-pending block.

In another aspect, an embodiment of the present disclosure provides a data processing apparatus, including: an obtaining unit, configured to obtain a consensus-pending block transmitted by a packaging node, the consensus-pending block being generated after packaging, by the packaging node, a plurality of groups of transaction data to be processed, the consensus-pending block recording at least one group of first transaction data and at least one group of second transaction data, and the first transaction data being determined according to a transaction execution result of each group of transaction data after executing the plurality of groups of transaction data in parallel; a processing unit, configured to perform first consensus processing on each group of first transaction data in the consensus-pending block, to obtain a first transaction execution result of each group of first transaction data; the processing unit being further configured to perform second consensus processing, different from the first consensus processing, on each group of second transaction data in the consensus-pending block, to obtain a second transaction execution result of each group of second transaction data; and the processing unit being further configured to combine the first transaction execution results and the second transaction execution results, to obtain a transaction combination execution result.

In another aspect, an embodiment of the present disclosure provides a computer device, including a memory and one or more processors, the memory storing computer-readable instructions, and the computer-readable instructions, when executed by processor(s), causing the one or more processors to perform the steps in foregoing data processing method.

In another aspect, an embodiment of the present disclosure provides one or more non-transitory computer-readable storage media, storing computer-readable instructions, and the computer-readable instructions, when executed by one or more processors, causing the one or more processors to perform the steps in the foregoing data processing method.

The details of one or more embodiments of the present disclosure are proposed in the accompanying drawings and the descriptions below. The other features, objects, and advantages of the present disclosure become apparent from the description, the accompanying drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show some embodiments of the present disclosure.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure.

Figure 1:
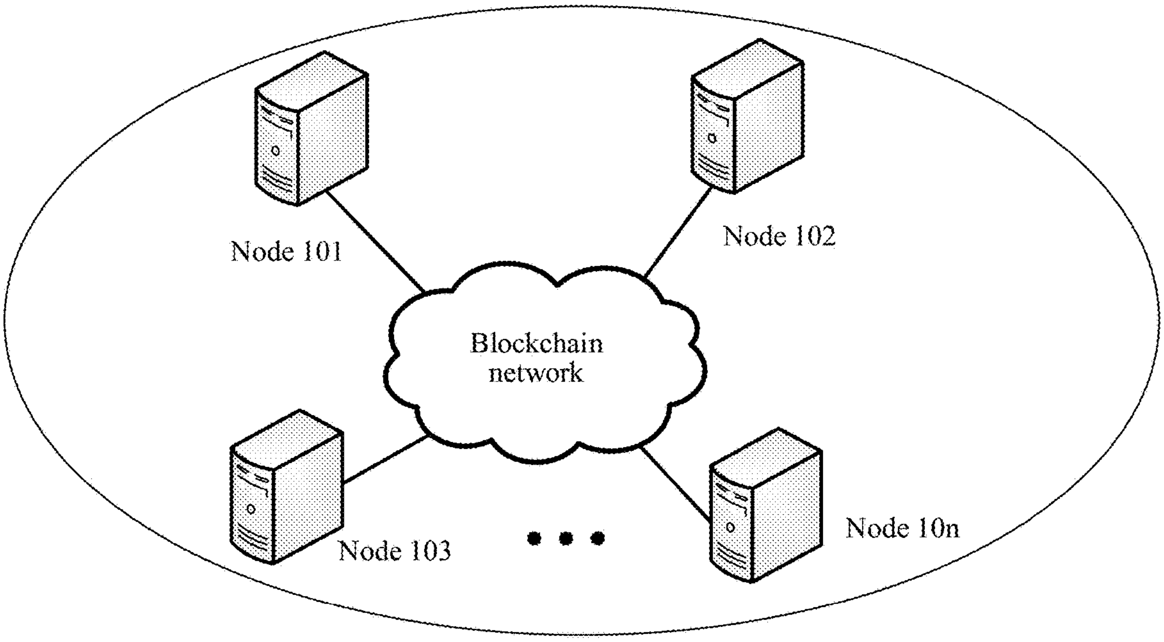
FIG. 1 is a schematic structural diagram of a blockchain node system according to an embodiment of the present disclosure.

The data processing method of the present disclosure may be combined with blockchain technologies. Next, the blockchain technologies involved in the data processing method provided in the present disclosure are described in detail:

1. Blockchain Node System:

A data processing system involved in the embodiments of the present disclosure may be a distributed system formed by connecting a plurality of nodes in form of network communication (that is, a blockchain node system). Next, the relevant technologies involved in the blockchain node system are described in detail in combination with FIG. 1:

FIG. 1 is a schematic structural diagram of a blockchain node system according to an embodiment of the present disclosure. A blockchain is a new application mode of computer technologies such as distributed data storage, peer-to-peer transmission, a consensus mechanism, and an encryption algorithm, which is mainly used for organizing data in a chronological order and encrypting the data into a ledger, so that the data cannot be tampered with and forged, and in addition data verification, storage, and update can be performed. Blockchains are essentially a decentralized database. Each node in the database stores a same blockchain. A blockchain network includes a consensus node, and the consensus node is responsible for consensus of the whole network of the blockchains.

The blockchain node system in FIG. 1 may correspond to a blockchain network, which may include, but is not limited to, a blockchain network corresponding to a consortium chain, a public chain, a private chain, or the like. The blockchain node system refers to a system for data sharing between blockchain nodes. The blockchain node system may include a plurality of nodes, which may specifically include a node 101, a node 102, a node 103, . . . , and a node 10*n*. Each one of the node 101, the node 102, the node 103, . . . , and the node 10*n* may be uniformly referred to as a blockchain node. A communication connection may be established between nodes in an information connection mode. No specific connection mode is limited for the foregoing information connection. For example, the information may be directly or indirectly connected in a wired communication mode, or may be directly or indirectly connected in a wireless communication mode, or may be connected in another connection mode, which is not limited in the present disclosure.

Each node in the blockchain node system may receive input information during a normal operation, and maintain shared data in the blockchain node system based on the received input information. To ensure information intercommunication within the blockchain node system, there may be an information connection between each two nodes in the blockchain node system, and the nodes may perform information transmission through the information connection. For example, in response to that any node in the blockchain node system receives input information, the other nodes in the blockchain node system obtain the input information according to a consensus algorithm, and store the input information as data in the shared data, so that data stored on all nodes in the blockchain node system are consistent.

In the blockchain network, information connections among nodes may be implemented based on node identities. Each node in the blockchain node system has a node identity corresponding thereto, and each node in the blockchain node system may store node identities of the other nodes in the blockchain node system, so as to facilitate subsequent broadcasting of a generated block to the other nodes in the blockchain node system according to the node identities of the other nodes. Each node may maintain a node identity list as shown in the following table, and node names and node identities are correspondingly stored in the node identity list.

The node identities each may be an IP (Internet Protocol, or a protocol for interconnection between networks) address and any other information that can be used to identify a node in a blockchain network. For example, IP addresses are used in table 1 for description. For example, a node 1 (for example, the node 1 may be the node 101 in FIG. 1) may transmit information (for example, a block) to a node 2 (for example, the node 2 may be the node 102 in FIG. 1) by using a node identity 000.000.000.000, and the node 2 may determine, by using a node identity 111.111.111.111, that the information is transmitted by the node 1.

TABLE 1

Node identity list

| Node name | Node identity |
|---|---|
| Node 1 | 000.000.000.000 |
| Node 2 | 111.111.111.111 |
| . . . | . . . |
| Node N | xxx.xxx.xxx.xxx |

The blockchain system may include a smart contract, which may be understood as code that can be understood and executed by all nodes of a blockchain (including consensus nodes, which refer to nodes in the blockchain system, having full ledger information, and participating in accounting consensus), and which may execute any logic and obtain a result. The blockchain may include one or more smart contracts, these smart contracts can be distinguished by identity (Identity document, ID) numbers or names, and a transaction data request may carry an identity number or name of a smart contract, so as to specify a smart contract that the blockchain needs to run.

Figure 2:
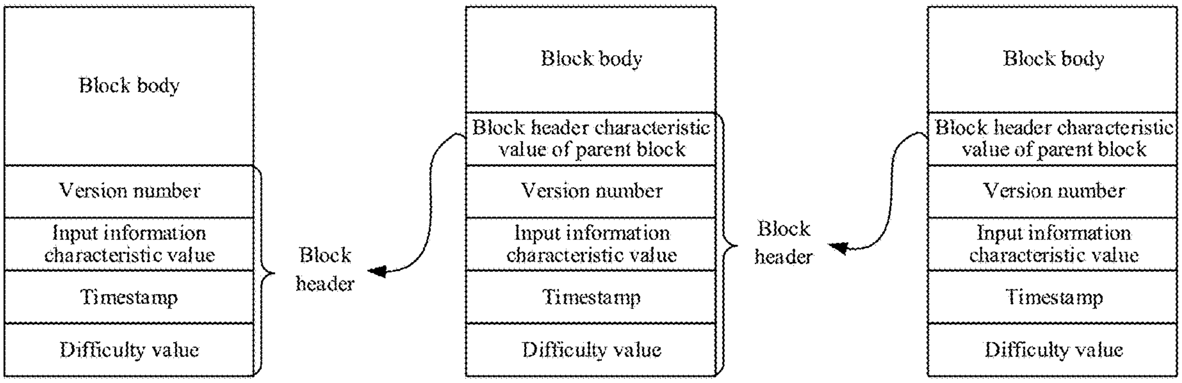
FIG. 2 is a schematic structural diagram of a blockchain according to an embodiment of the present disclosure.

2. Blockchain Structure:

FIG. 2 is a schematic structural diagram of a blockchain according to an embodiment of the present disclosure. As shown in FIG. 2, the blockchain is composed of a plurality of blocks (including a founding block). The founding block includes a block header and a block body, the block header stores an input information characteristic value, a version number, a timestamp, and a difficulty value, and the block body stores input information. A next block of the founding block uses the founding block as a parent block, the next block also includes a block header and a block body, the block header stores an input information characteristic value of the present block, a block header characteristic value of the parent block, a version number, a timestamp, and a difficulty value, and so on, so that block data stored in each block in the blockchain are associated with block data stored in the parent block, thereby ensuring the security of the input information in the block.

A block is a data packet that carries transaction data on a blockchain network, and has a data structure marked with a timestamp and a hash value of a previous block, and the block verifies and determines a transaction in the block by using a consensus mechanism of the network.

The transaction data processing method provided by the embodiments of the present disclosure may be executed by a computer device, which includes, but is not limited to, a terminal device or a server. The terminal device may include, but is not limited to, a mobile phone, a tablet computer, a laptop, a palmtop computer, a mobile Internet device (Mobile Internet Device, MID), a smart voice interaction device, a vehicle-mounted terminal, a roadside device, an aircraft, a wearable device, a smart home appliance, or a wearable device having a network configuration management function, such as a smart watch, a smart bracelet, and a pedometer. The server may be an independent physical server, or a server cluster or distributed system composed of a plurality of physical servers, or may be a cloud server for providing basic cloud computing services, such as a cloud service, a cloud database, cloud computing, a cloud function, cloud storage, a network service, cloud communication, a middleware service, a domain name service, a security service, a CDN (Content Delivery Network, content delivery network), big data, and an artificial intelligence platform.

In a blockchain, before a block (that is, a consensus-pending block) is chained, the block needs to undergo consensus by consensus nodes in the blockchain network, and only when the consensus succeeds, the block can be added to the blockchain. In response to that the blockchain is used in some scenarios of government or commercial organizations, not all participating nodes in the blockchain (that is, the blockchain nodes in the foregoing blockchain node system) have sufficient resources and necessity to become consensus nodes of the blockchain. For example, in the blockchain node system in FIG. 1, the node 101, the node 102, and the node 103 may be used as consensus nodes in the blockchain node system. The node 101 may serve as a packaging node for packaging a generated block. The node 102 and the node 103 may serve as consensus nodes for participating in consensus. The packaging node is a consensus node.

The packaging node where the blockchain is located may separately transmit a newly generated block to the other consensus nodes in the blockchain node system where the packaging node is located according to the node identities of other consensus nodes in the blockchain node system, so that the consensus nodes perform consensus on the newly generated block and add the newly generated block to the stored blockchain after the consensus succeeds.

Figure 3:
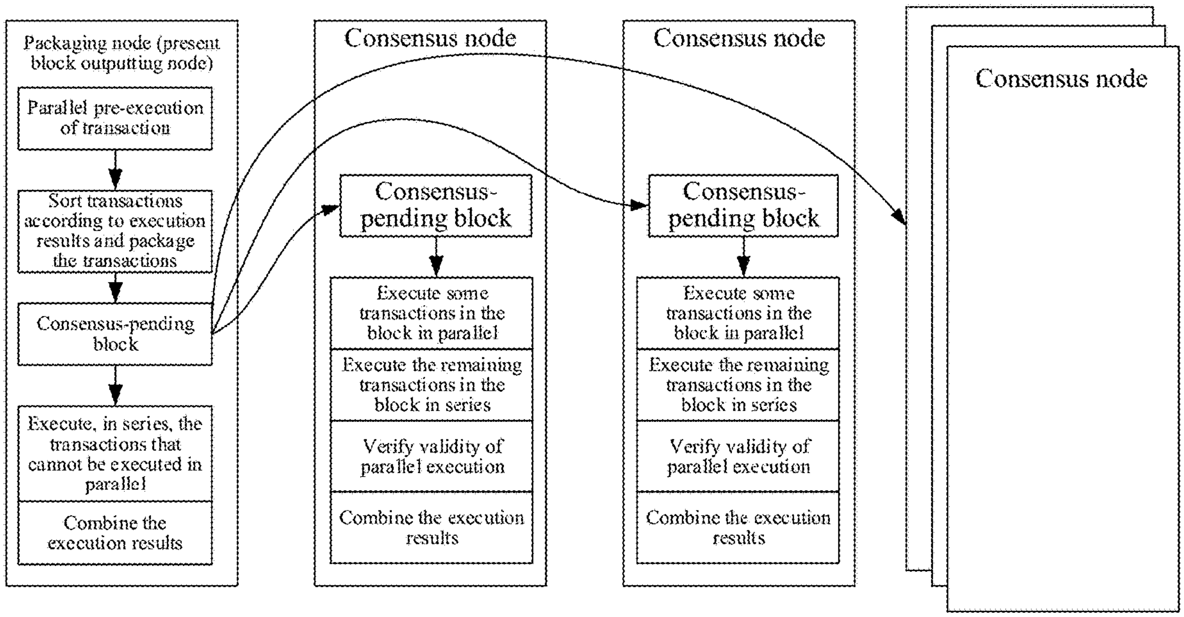
FIG. 3 is a schematic principle diagram of a data processing method according to an embodiment of the present disclosure.

Based on the foregoing description, the present disclosure provides a data processing method. FIG. 3 is a schematic principle diagram of a data processing method according to an embodiment of the present disclosure. As shown in FIG. 3, the principles of the data processing method are in the following: a packaging node may obtain N groups of consensus-pending transaction data, and execute the N groups of transaction data, where N is a positive integer. Then, M groups of first transaction data that meet a preset execution condition are determined from the N groups of transaction data according to a transaction execution result of each group of transaction data, where M is a positive integer and M≤N. Next, N groups of transaction data are packaged to generate a consensus-pending block. The consensus-pending block includes M groups of first transaction data and N-M groups of second transaction data other than the M groups of first transaction data. Finally, the consensus-pending block may be broadcast to a consensus node set. The consensus node set includes at least one consensus node, so that the consensus nodes in the consensus node set perform consensus verification processing on the consensus-pending block. The consensus verification processing includes: performing first consensus processing on the M groups of first transaction data and performing serial consensus processing on the N-M groups of second transaction data in the consensus-pending block. Each consensus node may also perform validity verification on a parallel consensus process, and in response to that the verification succeeds, transaction execution results of the groups of first transaction data and the groups of second transaction data may be combined.

In view of the above, in the embodiments of the present disclosure, the packaging node may pre-execute a plurality of groups of transaction data, then identify parallelizable transaction data according to transaction execution results, then package the parallelizable transaction data (that is, the first transaction data) and non-parallelizable transaction data (that is, the second transaction data) in these transaction data to a block, and finally broadcast the packaged block to the consensus nodes. Then, after the consensus nodes receive the consensus-pending block transmitted by the packaging node, the consensus nodes may execute the first transaction data in parallel and execute the second transaction data in series. By the consensus mode, the problems of low performance and low system throughput caused by serial execution of a relatively great amount of transaction data are solved. By the present disclosure, because the transaction data can be executed in parallel, the efficiency of executing the blockchain is improved and the throughput of the system is improved.

In a subsequent embodiment of the present disclosure, the transaction data is involved, and in response to that the foregoing embodiments of the present disclosure are applied to specific products or technologies, collection, use, and processing of the transaction data need to comply with relevant laws, regulations, and standards of relevant countries and regions.

Figure 4:
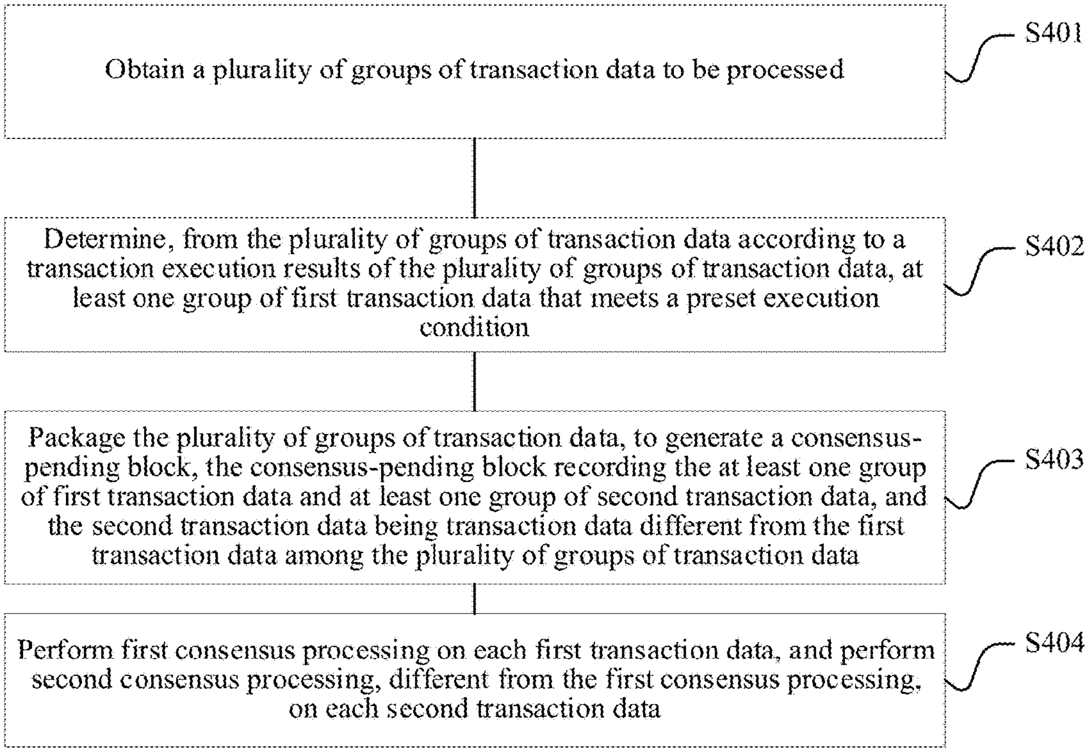
FIG. 4 is a schematic flowchart of a data processing method according to an embodiment of the present disclosure.

Based on the foregoing descriptions of the data processing method and system, an embodiment of the present disclosure provides a data processing method. FIG. 4 is a schematic flowchart of a data processing method according to an embodiment of the present disclosure. The data processing method can be applied in a blockchain and can be executed by the above-mentioned blockchain node (for example, the packaging node). Because the blockchain node pertains to a computer device, for brief description, subsequently the description is provided by an example in which the data processing method is executed by the computer device. The data processing method may include the following steps S401 to S404:

S401: Obtain a plurality of groups of transaction data to be processed.

The plurality of groups of transaction data refer to at least two groups of transaction data, for example, N groups of transaction data, where N is a positive integer. The computer device may execute the plurality of groups of transaction data in parallel, and certainly, may execute the transaction data in series.

For example, the plurality of groups of transaction data are N groups of transaction data. In this embodiment of the present disclosure, the computer device may obtain N groups of transaction data from a transaction cache pool, where the N groups of transaction data may be some or all of the transaction data in the transaction cache pool. In response to that the N groups of transaction data are some of the transaction data in the transaction cache pool, the computer device may obtain the N groups of transaction data in the following mode: sequentially obtaining the N groups of transaction data from the transaction cache pool according to transaction generation timestamps, or randomly obtaining the N groups of transaction data from the transaction cache pool.

The executing, by the computer device, the N groups of transaction data may specifically include: executing the N groups of transaction data in parallel. Assuming that the N groups of transaction data are respectively indicated as: transaction data 1, transaction data 2 . . . , and transaction data N, the so-called executing the N groups of transaction data in parallel specifically includes: executing the transaction data 2, the transaction data 3 . . . , and the transaction data N while executing the transaction data 1.

In some embodiments, the body that executes each transaction data in this embodiment is the packaging node, and certainly, the body that executes each transaction data may be another body different from the body that executes this method. For example, the body may be any blockchain node. Each transaction data may be executed by a same blockchain node, or may be executed by different blockchain nodes.

S402: Determine, from the plurality of groups of transaction data according to transaction execution results of the plurality of groups of transaction data, at least one group of first transaction data that meets a preset execution condition.

The first transaction data include one or more groups, and the plurality of groups refer to at least two groups. For example, there are M groups of first transaction data, where M is a positive integer and M≤N. The first transaction data is transaction data that meets a preset execution condition among the plurality of groups of transaction data. The preset execution condition may be a condition to be satisfied for parallel execution. Therefore, the preset execution condition may also be referred to as a parallel execution condition.

S403: Package the plurality of groups of transaction data, to generate a consensus-pending block, the consensus-pending block recording the at least one group of first transaction data and at least one group of second transaction data, and the at least one group of the second transaction data being transaction data different from the at least one group of the first transaction data among the plurality of groups of transaction data.

The second transaction data is transaction data that does not meet a preset execution condition among the plurality of groups of transaction data. The consensus-pending block differentially records the first transaction data and the second transaction data. Differential recording may be implemented by using a differential record rule. The consensus-pending block records each first transaction data and each second transaction data based on the differential record rule. The computer device may set different labels for the first transaction data and the second transaction data to record the first transaction data and the second transaction data differentially. The labels may be set according to requirements, and the labels may be numerals or strings. For example, the label of the first transaction data is 1, and the label of the second transaction data is 0.

S404: Perform first consensus processing on each first transaction data, and perform second consensus processing, different from the first consensus processing, on each second transaction data.

The first consensus processing and the second consensus processing are two different consensus processing methods. For example, the first consensus processing is a method for performing consensus in parallel, that is, the first consensus processing may be parallel consensus processing, and the second consensus processing may be a method for performing consensus in series, that is, the second consensus processing may be serial consensus processing. A consensus node set includes one or more consensus nodes, for example, the consensus node set includes at least two consensus nodes. After the computer device (that is, the packaging node) broadcasts the consensus-pending block to the consensus node set, all or some of the consensus nodes in the consensus node set can perform parallel consensus processing on each first transaction data and serial consensus processing on the second transaction data in the consensus-pending block.

In some embodiments, the consensus nodes in the consensus node set may perform, based on the differential record rule, parallel consensus processing on each first transaction data and serial consensus processing on each second transaction data in the consensus-pending block.

In some embodiments, in response to that there are a plurality of groups of first transaction data, the computer device separately performs first consensus processing on each group of first transaction data, for example, separately performs parallel consensus processing. In response to that there are a plurality of groups of second transaction data, the computer device separately performs second consensus processing on each group of second transaction data, for example, separately performs serial consensus processing.

In some embodiments, the computer device may broadcast the consensus-pending block to the consensus node set, so that the consensus nodes in the consensus node set perform parallel consensus processing on each first transaction data and serial consensus processing on each second transaction data in the consensus-pending block.

In this embodiment of the present disclosure, a plurality of groups of transaction data are pre-executed, then parallelizable transaction data are identified according to transaction execution results, then the parallelizable transaction data (that is, the first transaction data) and non-parallelizable transaction data (that is, the second transaction data) in these transaction data are packaged to a block, and finally the packaged block is broadcast to the plurality of consensus nodes, so that the consensus nodes can execute the first transaction data in parallel and then execute second transaction data in series. By such the consensus mode, parallel consensus processing can be performed on a portion of the transaction data that can be executed in parallel, which improves the efficiency of data processing compared to the serial execution of all transaction data, thereby improving the throughput of the blockchain system.

In one embodiment, the consensus-pending block records the first transaction data and the second transaction data in a differential record rule, and the differential record rule includes: an arrangement rule and a label setting rule. Packaging, by the computer device, a plurality of groups of transaction data, to generate a consensus-pending block may specifically include the following steps: packaging the plurality of groups of transaction data according to the arrangement rule, to generate a consensus-pending block; setting a target label for each second transaction data in the consensus-pending block, the target label being set based on the label setting rule, where after packaging the plurality of groups of transaction data based on the arrangement rule, the at least one group of the first transaction data in the consensus-pending block has a higher priority in consensus processing than the at least one group of the second transaction data.

In some embodiments, the label setting rule is used for indicating that any group of second transaction data packaged to the consensus-pending block is provided with a target label. After each group of first transaction data and each group of second transaction data are determined from the plurality of groups of transaction data, each group of first transaction data that meets the preset execution condition may be preferentially packaged to the block, and then each group of second transaction data that does not meet the preset execution condition is packaged to the block, so as to generate a consensus-pending block. In a process of packaging each group of first transaction data to the block, each group of first transaction data may be sequentially packaged in a temporal order according to transaction generation time of each group of first transaction data. In a process of packaging each group of second transaction data to the block, each group of second transaction data may be sequentially packaged in a temporal order according to a transaction generation timestamp of each group of second transaction data. In addition, any group of second transaction data may further be provided with a target label, for example, NeedRedo. Certainly, for any group of first transaction data, the group of first transaction data may not be provided with any label, or may be provided with another label different from the target label, for example, unNeedRedo.

Figure 8:
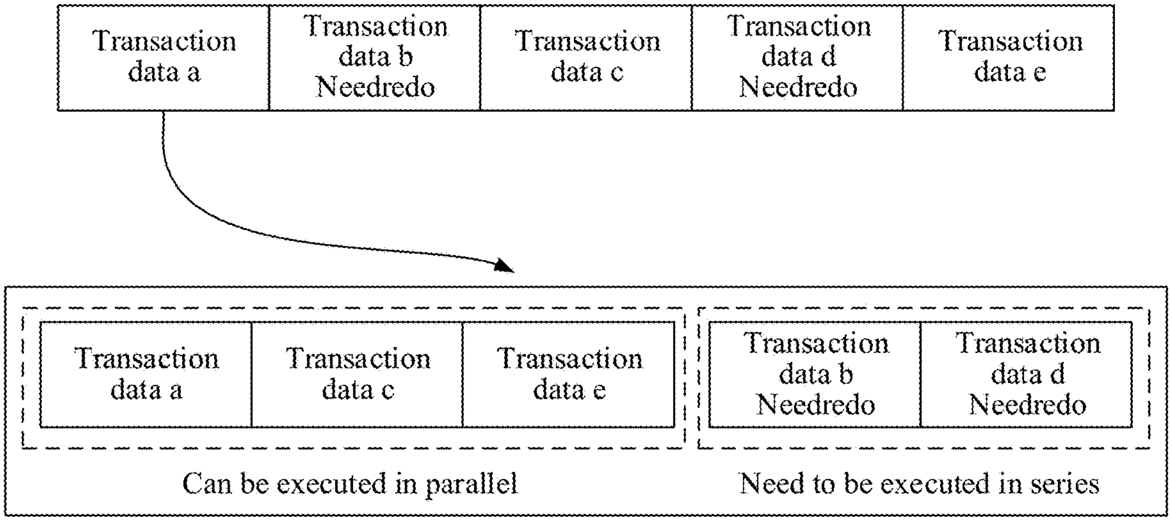
FIG. 8 is a schematic flowchart of generating consensus-pending block according to an embodiment of the present disclosure.

For example, FIG. 8 is a schematic flowchart of generating consensus-pending block according to an embodiment of the present disclosure. As shown in FIG. 8, it is assumed that the N groups of transaction data are respectively indicated as: transaction data a, transaction data b, transaction data c, transaction data d, and transaction data e. In response to that the transaction data a, the transaction data c, and the transaction data e are determined to be the first transaction data, that is, transaction data that can be executed in parallel, and the transaction data b and the transaction data d are determined to be the second transaction data, that is, transaction data that cannot be executed in parallel (that is, needing to be executed in series), the transaction data a, the transaction data c, and the transaction data e can be preferably packaged to a block, and then the transaction data b and the transaction data d are packaged to the block, so as to generate a consensus-pending block in FIG. 8.

In this embodiment, the plurality of groups of transaction data are quickly packaged, to generate the consensus-pending block based on the arrangement rule and the label setting rule, and the first transaction data and the second transaction data are distinguished in the consensus-pending block, which improves the efficiency of generating the consensus-pending block.

In one embodiment, before executing the plurality of groups of transaction data, the computer device may further create a corresponding transaction read cache and transaction write cache for each group of transaction data in the plurality of groups of transaction data. The transaction read cache corresponding to the transaction data is configured to store a read data set of the transaction data, the read data set being applied in triggering to invoke a smart contract, so as to execute the transaction data. The transaction write cache corresponding to the transaction data is configured to store a write data set of the transaction data, the write data set storing a transaction execution result obtained after invoking the smart contract to execute the transaction data.

The invoking information may include, but is not limited to, at least one of an invoking address of the smart contract or a contract identity. The contract identity is, for example, a contract name. The read data set is used for indicating the invoking information of the smart contract corresponding to execution of the transaction data.

In this embodiment, a corresponding transaction read cache and transaction write cache are created for each group of transaction data, to provide cache resources for execution of each group of transaction data, so as to facilitate smooth execution of each group of transaction data and improve the efficiency of executing the transaction data.

In some embodiments, the computer device may obtain a read data set of target transaction data from the transaction read cache, and obtain, based on the invoking information in the read data set of the target transaction data, a target smart contract for executing the target transaction data; then the computer device may invoke the target smart contract to execute the target transaction data, to obtain a target transaction execution result, where the target transaction execution result serves as a write data set of the target transaction data. The target transaction data refers to any group of transaction data in the plurality of groups of transaction data.

The transaction read cache corresponding to the target transaction data includes a read data set corresponding to the target transaction data. Therefore, the computer device can obtain the read data set corresponding to the target transaction data from the transaction read cache corresponding to the target transaction data, obtain, based on the contract invoking address and the contract name in the read data set corresponding to the target transaction data, the smart contract for executing the target transaction data, and invoke the smart contract to execute the target transaction data, so as to obtain the transaction execution result corresponding to the target transaction data, and can add the transaction execution result to the transaction write cache of the target transaction data, so that the write data set corresponding to the target transaction data can be constructed based on the data stored in the transaction write cache.

Figure 5A:
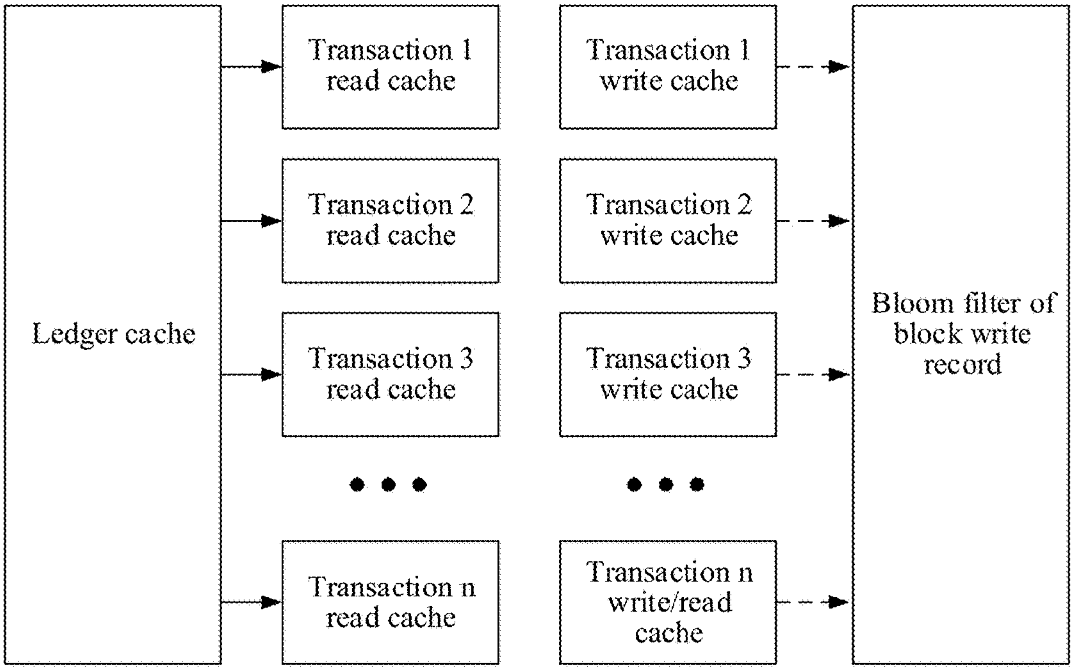
FIG. 5*a* is a schematic flowchart of executing transaction data in parallel according to an embodiment of the present disclosure.

FIG. 5*a* is a schematic flowchart of executing transaction data in parallel according to an embodiment of the present disclosure. As shown in FIG. 5*a*, the computer device may create a corresponding transaction read cache and transaction write cache for each group of transaction data based on a ledger cache. One group of transaction data corresponds to one group of transaction read caches and one group of transaction write caches. For example, in response to that the plurality of groups of transaction data are N groups of transaction data, there are a transaction 1 read cache, a transaction 2 read cache, . . . , and a transaction N read cache; and a transaction 1 write cache, a transaction 2 write cache, . . . , and a transaction N write cache.

Figure 5B:
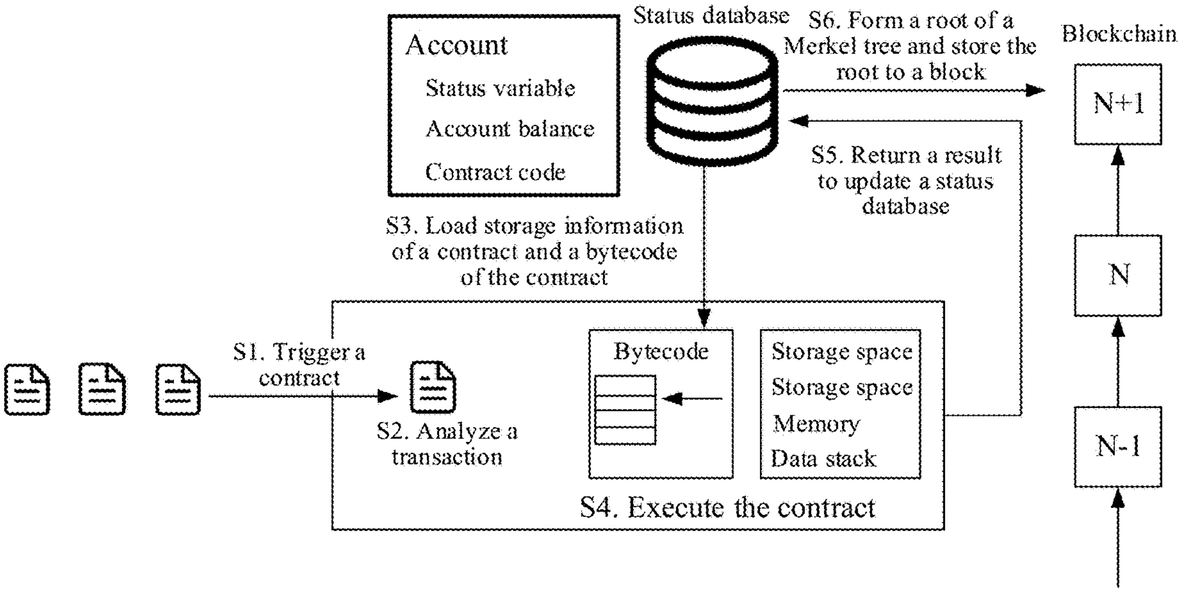
FIG. 5*b* is a schematic flowchart of a process of executing transaction data according to an embodiment of the present disclosure.

FIG. 5*b* is a schematic flowchart of a process of executing transaction data according to an embodiment of the present disclosure. As shown in FIG. 5*b*, an execution process of invoking a smart contract to execute target transaction data may include the following steps S1 to S6:

S1: Trigger a contract.

In some embodiments, a computer device may obtain a read data set corresponding to the target transaction data from a transaction read cache corresponding to the target transaction data, and trigger to invoke a corresponding smart contract based on the read data set corresponding to the target transaction data.

S2: Analyze a transaction.

In some embodiments, the computer device obtains, based on a contract invoking address and a contract name in the read data set corresponding to the target transaction data, a smart contract for executing the target transaction data.

The smart contract includes at least one of a contract name, a contract method, or a contract input.

S3: Load storage information of a contract and a bytecode of the contract.

In some embodiments, the computer device obtains the corresponding contract bytecode and contract input from the target transaction data and a status database.

S4: Execute the contract.

In some embodiments, contract code or contract bytecode is executed in the computer device to complete service logic corresponding to the target transaction data.

S5: Return a result to update a status database.

In some embodiments, the computer device writes the transaction execution result back to the status database to complete updating of a service status.

S6: Form a root of a Merkel tree and store the root to a block.

In some embodiments, in response to that all the transaction data in the consensus-pending block have been executed, the system stores, to the blockchain, a hash digest of a present state of the status database as an authentication record.

In this embodiment, for each group of transaction data, a transaction execution result of each group of transaction data can be obtained by invoking a corresponding smart contract to execute a related service operation, and the transaction execution result of each group of transaction data is written to the transaction write cache, so that the transaction execution result serves as data in the data write data set, thereby improving the efficiency of executing the transaction data.

In one embodiment, the transaction execution result of each group of transaction data is stored to the corresponding transaction write cache in form of a key-value pair, and the read data set of each group of transaction data is stored to the corresponding transaction read cache in form of a key-value pair. That the computer device determines, from the plurality of groups of transaction data according to transaction execution results of the plurality of groups of transaction data, at least one group of first transaction data that meets a preset execution condition specifically includes: the computer device may further obtain a write keyword of each group of transaction data from the transaction write cache, and perform a hashing operation on the write keyword of each group of transaction data, to obtain a first hash string of each group of transaction data, where the write keyword refers to a key in the key-value pair corresponding to the transaction execution result; the computer device traverses the read data set of each group of transaction data, and performs a hashing operation on a read keyword of each group of transaction data, to obtain a second hash string of each group of transaction data, where the read keyword refers to a key in the key-value pair corresponding to the read data set; and then the computer device matches the second hash string of each group of transaction data with each first hash string, and determines, from the plurality of groups of transaction data according to a matching result, at least one group of first transaction data that meets the preset execution condition.

The key-value pair is composed of a key and a value. The write keyword refers to the key in the key-value pair corresponding to the transaction execution result, that is, the write keyword is key.

In some embodiments, the computer device may further obtain a write keyword of each group of transaction data from the transaction write cache, and perform a hashing operation on the write keyword of each group of transaction data, to obtain a first hash string of each group of transaction data, and the computer device may write the first hash string of each group of transaction data to a Bloom filter. The mode of writing the first hash string of each group of transaction data to the Bloom filter may be used for performing identification and classification processing on each group of transaction data, so as to determine the first transaction data that meets the preset execution condition from the plurality of groups of transaction data, and determine the second transaction data that does not meet the preset execution condition from the plurality of groups of transaction data. In some embodiments, the Bloom filter (Bloom Filter) is a bit (bit) vector or a bit array. The data structure of the Bloom filter may be as shown in the following table 2:

TABLE 2

| Bloom filter data structure | | | | | | | | | | |
|---|---|---|---|---|---|---|---|---|---|---|
| 0 | 0 | 0 | 0 | 0 | 0 | 0 | 0 | 0 | 0 | 0 |

Based on table 2, the principles of the Bloom filter are roughly in the following: the Bloom filter is an array including a plurality of (for example, 11) bits, and a value of each bit in an initialized Bloom filter is 0. In response to that a value needs to be added to the Bloom filter, a plurality of different hash functions need to be used to generate a plurality of hash values, and a bit pointed to by each generated hash value is set to 1.

Figure 6:
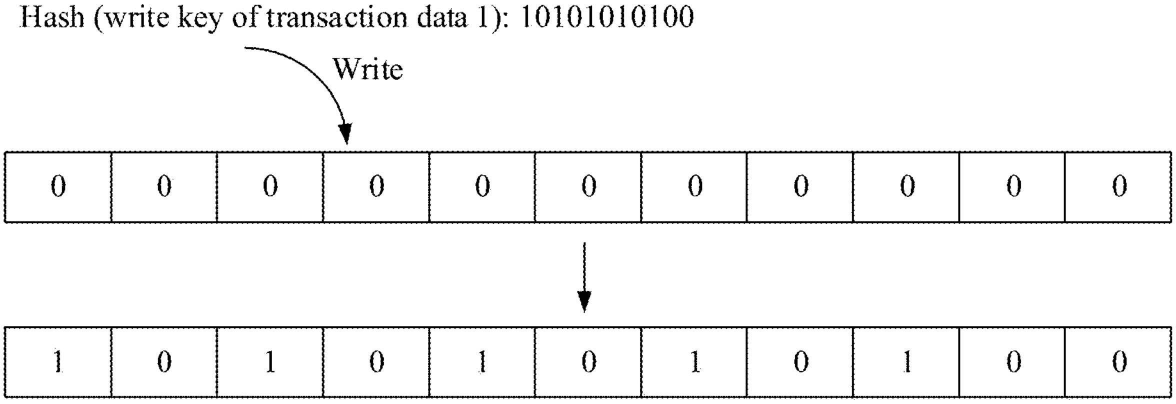
FIG. 6 is a schematic principle diagram of a Bloom filter according to an embodiment of the present disclosure.

For example, in this embodiment of the present disclosure, for a write keyword key1 corresponding to any transaction data (for example, the transaction data 1), one or more hash functions may be used to separately perform a hashing operation, to obtain (a) corresponding hash string(s), where "more" refers to at least two. FIG. 6 is a schematic principle diagram of a Bloom filter according to an embodiment of the present disclosure. As shown in FIG. 6, assuming that the Bloom filter is a bit array of 11 bits and there are five hash functions, after performing a hashing operation to a write keyword key1 corresponding to transaction data 1, a first hash string obtained is 10101010100, and then the first hash string 10101010100 is written to the Bloom filter. A corresponding detailed process of writing each group of transaction data to the Bloom filter is as stated above.

In this embodiment, the second hash string of each group of transaction data is matched with each first hash string, and each group of first transaction data that meets a preset execution condition is determined from the plurality of groups of transaction data according to a matching result, so that the first transaction data can be quickly determined by using the matching result between strings, thereby improving the efficiency of determining the first transaction data.

In some embodiments, the computer device may write the first hash string of each group of transaction data to the Bloom filter. Matching the second hash string of each group of transaction data with each first hash string includes: matching the second hash string of each group of transaction data with each first hash string in the Bloom filter.

In one embodiment, the read data set of each group of transaction data is stored to the corresponding transaction read cache in form of a key-value pair. That the computer device determines, from the plurality of groups of transaction data according to transaction execution results of the plurality of groups of transaction data, each group of first transaction data that meets a preset execution condition may specifically include: first traversing the read data set of each group of transaction data, and performing a hashing operation on a read keyword of each group of transaction data, to obtain a second hash string of each group of transaction data, where the read keyword refers to a key in the key-value pair corresponding to the read data set; and then matching the second hash string of each group of transaction data with each first hash string in the Bloom filter, and determining, from the plurality of groups of transaction data according to a matching result, each group of first transaction data that meets the preset execution condition.

In this embodiment, for the matching the second hash string of each group of transaction data with each first hash string in the Bloom filter, and string matching may be quickly performed based on the Bloom filter, thereby improving the matching efficiency.

In some embodiments, determining, from the plurality of groups of transaction data according to a matching result, at least one group of first transaction data that meets the preset execution condition includes: matching the second hash string of the transaction data with each first hash string in the Bloom filter; in response to that the matching result is that the matching is unsuccessful, determining that the transaction data meets the preset execution condition and determining the transaction data to be the first transaction data; and in response to that the matching result is that the matching is successful, determining that the target transaction data does not meet the preset execution condition and determining the target transaction data to be the second transaction data.

In some embodiments, for each group of transaction data, in response to that the second hash string of transaction data does not match each first hash string, it is determined that the transaction data is the first transaction data. In response to that the second hash string of the transaction data matches any first hash string, it is determined that the transaction data is the second transaction data.

Figure 7A:
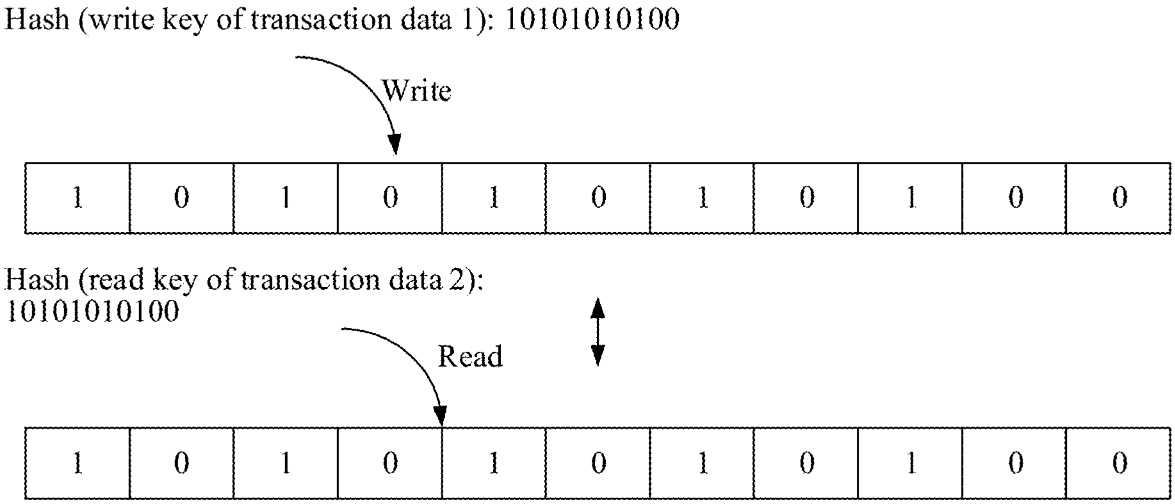
FIG. 7*a* is a schematic flowchart of determining second transaction data according to an embodiment of the present disclosure.

For example, FIG. 7*a* is a schematic flowchart of determining second transaction data according to an embodiment of the present disclosure. As shown in FIG. 7*a*, a read keyword key2 of the transaction data 2 is obtained from a transaction read cache of the transaction data 2, and a hashing operation is performed on the read keyword key2 by using one or more hash functions (for example, five hash functions), to obtain a second hash string, which is assumed to be 10101010100. Next, the second hash string is compared with each first hash string in the Bloom filter. Because the second hash string of the transaction data 2 is the same as the first hash string 10101010100 of the transaction data 1 in the Bloom filter, it can be determined that the transaction data 2 has read data written through the transaction data 1, and therefore the transaction data 2 needs to be executed after the transaction data 1, and the transaction data 2 is transaction data (that is, the second transaction data) that does not meet the preset execution condition.

Figure 7B:
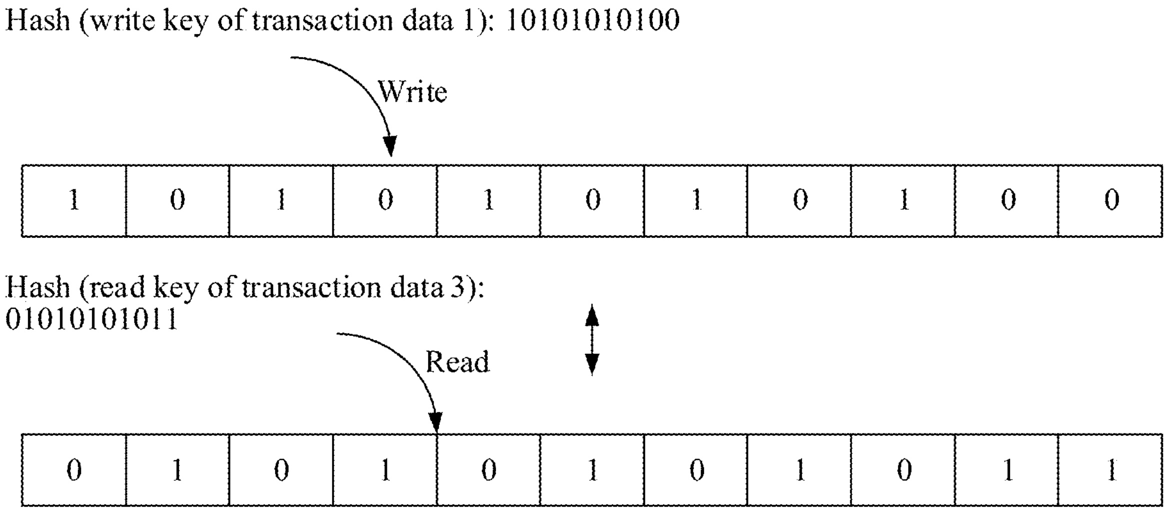
FIG. 7*b* is a schematic flowchart of determining first transaction data according to an embodiment of the present disclosure.

Still for example, FIG. 7*b* is a schematic flowchart of determining first transaction data according to an embodiment of the present disclosure. As shown in FIG. 7*b*, a read keyword key3 of the transaction data 3 is obtained from a transaction read cache of the transaction data 3, and a hashing operation is performed on the read keyword key3 by using one or more hash functions (for example, five hash functions), to obtain a second hash string, which is assumed to be 0101010101011. Next, the second hash string is compared with each first hash string in the Bloom filter. Because the second hash string of the transaction data 3 is different from any first hash string in the Bloom filter, it can be determined that the transaction data 3 is transaction data (that is, the first transaction data) that meets the preset execution condition.

In this embodiment, the first transaction data and the second transaction data are accurately determined from each transaction data by using a matching result of the first hash string and the second hash string.

In one embodiment, after broadcasting the consensus-pending block to the consensus node set, the computer device may further perform the following steps: executing each group of second transaction data in series, to obtain a second transaction execution result of each group of second transaction data; obtaining a first transaction execution result of each group of first transaction data from the transaction execution result of each group of transaction data; and combining the first transaction execution results and the second transaction execution results, to obtain a transaction combination execution result.

For example, assuming that the second transaction data are respectively indicates as a second transaction data a, a second transaction data b, . . . , and a second transaction data x, after the second transaction data a is executed, the second transaction data b is executed, the second transaction data c is executed next, and so on, so that each group of second transaction data is sequentially executed. The execution order may refer to a temporal order according to a transaction generation timestamp of each group of second transaction data.

In addition, the computer device may combine the first transaction execution results and the second transaction execution results according to a transaction arrangement order of each group of transaction data in the consensus-pending block, to obtain a transaction combination execution result. The so-called transaction arrangement order may refer to a temporal order according to a transaction generation timestamp of each group of second transaction data.

In this embodiment, the first transaction execution results and the second transaction execution results are combined to obtain a transaction combination execution result, so as to obtain a total execution result of the plurality of groups of transaction data, thereby improving the efficiency of obtaining the execution result of the plurality of groups of transaction data.

Figure 9:
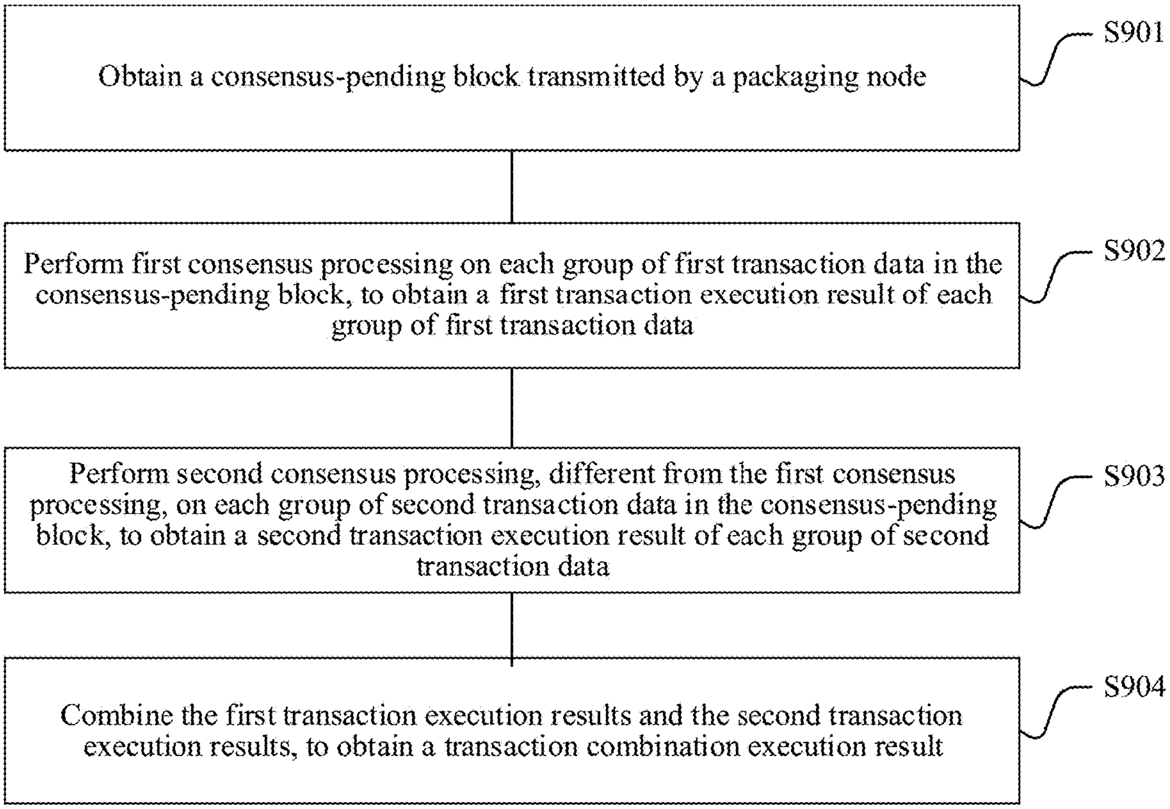
FIG. 9 is a schematic flowchart of another data processing method according to an embodiment of the present disclosure.

FIG. 9 is a schematic flowchart of another data processing method according to an embodiment of the present disclosure. The data processing method can be applied to a blockchain and can be executed by the above-mentioned blockchain node (for example, any consensus node other than the packaging node). For brief description, subsequently the description is provided by an example in which the data processing method is executed by the computer device. The data processing method may include the following steps S901 to S904:

S901: Obtain a consensus-pending block transmitted by a packaging node.

The consensus-pending block is generated after the packaging node packages a plurality of groups of transaction data to be processed. The plurality of groups of transaction data include a first transaction data and a second transaction data. The consensus-pending block records each group of first transaction data and each group of second transaction data based on a differential record rule. The first transaction data is determined according to a transaction execution result of each group of transaction data after the plurality of groups of transaction data are executed in parallel. For example, the plurality of groups of transaction data are N groups of transaction data, and the N groups of transaction data include M groups of first transaction data and N-M groups of second transaction data. Both N and M are positive integers, and $M \leq N$.

The differential record rule includes: an arrangement rule and a label setting rule. The arrangement rule is used for indicating packaging the plurality of groups of transaction data and generate a consensus-pending block. The label setting rule is used for indicating that any group of second transaction data packaged to the consensus-pending block is provided with a target label. For example, the target label carried by any group of second transaction data may be NeedRedo.

The computer device determines the specific execution step of each group of first transaction data according to the transaction execution result of each group of transaction data. Details can be referred to in the specific steps executed in step S402 in the foregoing embodiment in FIG. 4.

S902: Perform first consensus processing on each group of first transaction data in the consensus-pending block, to obtain a first transaction execution result of each group of first transaction data.

In some embodiments, in response to that the plurality of groups of transaction data include M groups of first transaction data, the performing, by the computer device, parallel consensus processing on the M groups of first transaction data includes: executing the M groups of first transaction data in parallel. Assuming that the M groups of first transaction data are respectively indicated as: a first transaction data 1, a first transaction data 2, . . . , and a first transaction data M, executing the M groups of first transaction data in parallel specifically includes: executing the first transaction data 2, the first transaction data 3, . . . , and the first transaction data M while executing the first transaction data 1.

In one embodiment, before performing parallel consensus processing on the M groups of first transaction data in the consensus-pending block, the computer device is further configured to obtain a node identity of the packaging node, perform verification on the packaging node based on the obtained node identity, and in response to that the verification succeeds, trigger the step of performing parallel consensus processing on the M groups of first transaction data in the consensus-pending block, to obtain a first transaction execution result of each group of first transaction data, or in response to that the verification fails, delete the consensus-pending block. In this way, identity information of the packaging node is verified before the consensus processing, and the accuracy of the data processing process can be improved.

In some embodiments, any group of first transaction data in the consensus-pending block does not carry a target label, and any group of second transaction data carries the target label. Then, after obtaining the consensus-pending block, the computer device determines the transaction data that does not carry the target label to be the first transaction data that meets the preset execution condition, and after executing these first transaction data, the first transaction execution result of each group of first transaction data can be obtained respectively. For a specific step of executing any first transaction data by the computer device to obtain a corresponding first transaction execution result, details may be referred to in the related content described in the foregoing embodiment in FIG. 4.

S903: Perform second consensus processing, different from the first consensus processing, on each group of second transaction data in the consensus-pending block, to obtain a second transaction execution result of each group of second transaction data.

In some embodiments, the performing, by the computer device, second consensus processing on the N-M groups of second transaction data includes: executing the N-M groups of first transaction data in series. Assuming that the N-M groups of second transaction data is respectively indicated as: a second transaction data a, a second transaction data b, . . . , and a second transaction data x, executing the N-M groups of second transaction data in parallel specifically includes: executing the second transaction data b after the second transaction data a is executed, and executing the second transaction data c after the second transaction data b is executed, and so on, until the second transaction data x is executed.

Any group of second transaction data in the consensus-pending block is provided with a target label (for example, NeedRedo). Then, after obtaining the consensus-pending block, the computer device determines the transaction data carrying the target label to be the second transaction data that does not meet the preset execution condition (that is, requiring serial execution), and then after executing these second transaction data (that is, the N-M groups of second transaction data), the second transaction execution result of each group of second transaction data may be obtained respectively. For a specific step of executing any second transaction data by the computer device to obtain a corresponding second transaction execution result, details may be referred to in the related content described in the foregoing embodiment in FIG. 4.

S904: Combine the first transaction execution results and the second transaction execution results, to obtain a transaction combination execution result.

In one embodiment, the computer device may combine the first transaction execution results and the second transaction execution results according to a transaction arrangement order of each group of transaction data (the first transaction data and the second transaction data) in the consensus-pending block, to obtain a transaction combination execution result. The so-called transaction arrangement order may refer to a temporal order according to a transaction generation timestamp of each group of second transaction data. For example, the N groups of transaction data include: transaction data 1, transaction data 2, transaction data 3, where a transaction generation timestamp of the transaction data 1 is t1, a transaction generation timestamp of the transaction data 2 is t2, a transaction generation timestamp of the transaction data 3 is t3, and t1<t2<t3, in response to that a transaction execution result s1 of the transaction data 1, a transaction execution result s2 of the transaction data 2, and a transaction execution result s3 of the transaction data 3 are combined, first s1 and s2 may be combined first to obtain s12, then s12 and s3 may be combined to obtain S123, and so on, so that a transaction combination execution result can be obtained after transaction execution results of all the transaction data are combined.

In one embodiment, the computer device may further write the transaction combination execution result back to the status database of the blockchain, so that the status database can implement updating of the service status according to the transaction execution result of each group of transaction data in a latest block (the consensus-pending block) that is written at present. For example, any transaction data included in the consensus-pending block is: an object A transfers m units of virtual resources to an account of an object B. Then, after the transaction execution result of the transaction data is obtained and written to the status database, updating operations of the service status performed in the status database may include: deducting the m units of virtual resources from an account of the object A, and adding the m units of virtual resources to the account of the object B.

In this embodiment of the present disclosure, after receiving the consensus-pending block transmitted by the packaging node, the consensus nodes in the blockchain may execute a portion of the transaction data in the consensus-pending block in parallel, and then execute the remaining transaction data in the consensus-pending block in series. By such the consensus mode, the problems of low performance and low system throughput caused by requiring serial execution of a large amount of transaction data are solved. By the present disclosure, because the transaction data can be executed in parallel, the efficiency of executing the blockchain is improved and the throughput of the system is greatly improved.

In one embodiment, after performing first consensus processing on each group of first transaction data in the consensus-pending block to obtain the first transaction execution result of each group of first transaction data, the computer device is further configured to perform the following steps: performing validity verification on a first consensus processing process, and in response to that the verification fails, deleting each first transaction execution result and each second transaction execution result; and performing second consensus processing on the plurality of groups of transaction data, to obtain a transaction execution result of each group of transaction data (e.g., updated transaction execution results of the plurality of groups of transaction data).

In this embodiment, the validity verification is performed on the first consensus processing process, and in response to that the verification fails, each first transaction execution result and each second transaction execution result are deleted, thereby improving the correctness of the transaction execution result.

In some embodiments, that the computer device performs validity verification on a first consensus processing process may specifically include: traversing a transaction read cache of the second transaction data, to obtain a read data set of the second transaction data, wherein the read data set is stored to the transaction read cache in form of a key-value pair; performing a hashing operation on a read keyword of the second transaction data, to obtain a verification hash string of the target second transaction data; and performing matching processing on the verification hash string based on the first hash string stored in a Bloom filter, and in response to that the matching succeeds, determining that verification of the first consensus processing process succeeds.

In response to that the matching is unsuccessful, it is determined that the verification of the first consensus processing process fails.

Any transaction data corresponds to a transaction read cache and a transaction write cache. The transaction read cache is configured to store a read data set of any group of transaction data. The read data set is used for indicating invoking information (for example, a contract name, an invoking address, and other information) of a smart contract corresponding to execution of the transaction data. The transaction write cache is configured to store a write data set of any group of transaction data. The write data set is used for storing a transaction execution result obtained after invoking the smart contract to execute the transaction data.

For details of a specific process of the first hash string stored in the Bloom filter, reference may be made to the relevant content of writing, by the computer device, the first hash string of each group of transaction data to the Bloom filter in the embodiment in FIG. 4.

Figure 10:
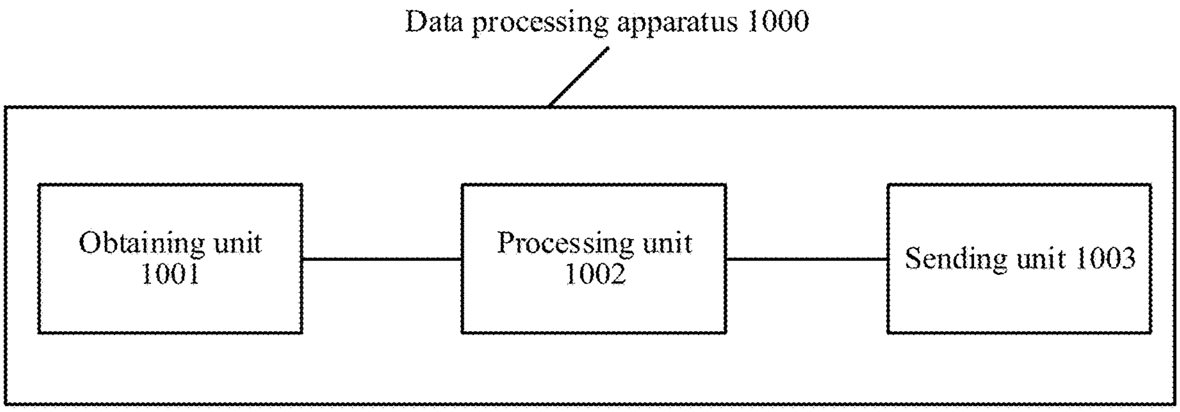
FIG. 10 is a schematic structural diagram of a data processing apparatus according to an embodiment of the present disclosure.

In this embodiment, in response to that the matching is successful, it is determined that the verification of the first consensus processing process succeeds, and the validity verification of the parallel consensus processing process is accurately performed. FIG. 10 is a schematic structural diagram of a data processing apparatus according to an embodiment of the present disclosure. The data processing apparatus 1000 may be applied to the computer device (for example, the packaging node) in the foregoing embodiments. The data processing apparatus 1000 may be a computer program (including program code) run on the computer device. For example, the data processing apparatus 1000 is application software. The data processing apparatus 1000 may be configured to execute corresponding steps in the data processing method according to the embodiments of the present disclosure. The data processing apparatus may 1000 include:

an obtaining unit 1001, configured to obtain a plurality of groups of transaction data to be processed;

a processing unit 1002, configured to determine, from the plurality of groups of transaction data according to transaction execution results of the plurality of groups of transaction data, at least one group of first transaction data that meets a preset execution condition;

the processing unit 1002 being further configured to package the plurality of groups of transaction data, to generate a consensus-pending block, the consensus-pending block recording each group of first transaction data and at least one group of second transaction data, and the second transaction data being transaction data different from the first transaction data among the plurality of groups of transaction data; and a transmitting unit 1003, configured to perform first consensus processing on the first transaction data, and perform second consensus processing, different from the first consensus processing, on each group of second transaction data.

In one embodiment, the consensus-pending block records the first transaction data and the second transaction data in a differential record rule, and the differential record rule includes: an arrangement rule and a label setting rule. The processing unit 1002 packages a plurality of groups of transaction data, to generate a consensus-pending block, and is configured to perform the following operations:

packaging the plurality of groups of transaction data according to the arrangement rule, to generate the consensus-pending block; each second transaction data in the consensus-pending block being provided with a target label, and the target label being set based on the label setting rule, where after packaging the plurality of groups of transaction data based on the arrangement rule, any group of the first transaction data in the consensus-pending block is preferentially subject to consensus processing before any group of the second transaction data. In other words, the at least one group of the first transaction data in the consensus-pending block has a higher priority in consensus processing than the at least one group of the second transaction data.

In one embodiment, before executing the plurality of groups of transaction data, the processing unit 1002 also configured to perform the following operation:

creating a corresponding transaction read cache and transaction write cache for each group of transaction data in the plurality of groups of transaction data, where the transaction read cache corresponding to the transaction data is configured to store a read data set of the transaction data, the read data set being applied in triggering to invoke a smart contract, so as to execute the transaction data; and the transaction write cache corresponding to the transaction data is configured to store a write data set of the transaction data, the write data set storing a transaction execution result obtained after invoking the smart contract to execute the transaction data.

In one embodiment, the processing unit 1002 is further configured to perform the following operations:

obtaining a read data set of target transaction data from the transaction read cache, and based on invoking information in the read data set of the target transaction data, obtaining a target smart contract for executing the target transaction data, where the target transaction data is any transaction data in the plurality of groups of transaction data; and invoking the target smart contract to execute the target transaction data, to obtain a target transaction execution result, where the target transaction execution result is applied in obtaining the write data set of the target transaction data.

In one embodiment, the transaction execution result of each group of transaction data is stored to the corresponding transaction write cache in form of a key-value pair, and the read data set of each group of transaction data is stored to the corresponding transaction read cache in form of a key-value pair. The processing unit 1002 is further configured to perform the following operations:

obtaining a write keyword of each group of transaction data from the transaction write cache, and performing a hashing operation on the write keyword of each group of transaction data, to obtain a first hash string of each group of transaction data, where the write keyword refers to a key in the key-value pair corresponding to the transaction execution result; traversing the read data set of each group of transaction data, and performing a hashing operation on a read keyword of each group of transaction data, to obtain a second hash string of each group of transaction data, where the read keyword refers to a key in the key-value pair corresponding to the read data set; and matching the second hash string of each group of transaction data with each first hash string, and determining, from the plurality of groups of transaction data according to a matching result, each group of first transaction data that meets the preset execution condition.

In one embodiment, the processing unit 1002 is further configured to write the first hash string of each group of transaction data to a Bloom filter, and match the second hash string of each group of transaction data with each first hash string in the Bloom filter.

In one embodiment, the processing unit 1002 determines, from plurality of groups of transaction data according to the matching results, at least one group of first transaction data that meets the preset execution conditions, and is configured to perform the following operations:

in response to that the matching result of the transaction data is unsuccessful, determining that the transaction data meets the preset execution condition and determining the transaction data to be the first transaction data; and in response to that the matching result of the transaction data is successful, determining that the transaction data does not meet the preset execution condition and determining the transaction data to be the second transaction data.

In one embodiment, after the transmitting unit 1003 broadcasts the consensus-pending block to the consensus node set, the processing unit 1002 is further configured to perform the following operations:

executing each group of second transaction data in series, to obtain a second transaction execution result of each group of second transaction data;

obtaining a first transaction execution result of each group of first transaction data from the transaction execution result of each group of transaction data; and combining the first transaction execution results and the second transaction execution results, to obtain a transaction combination execution result.

Figure 11:
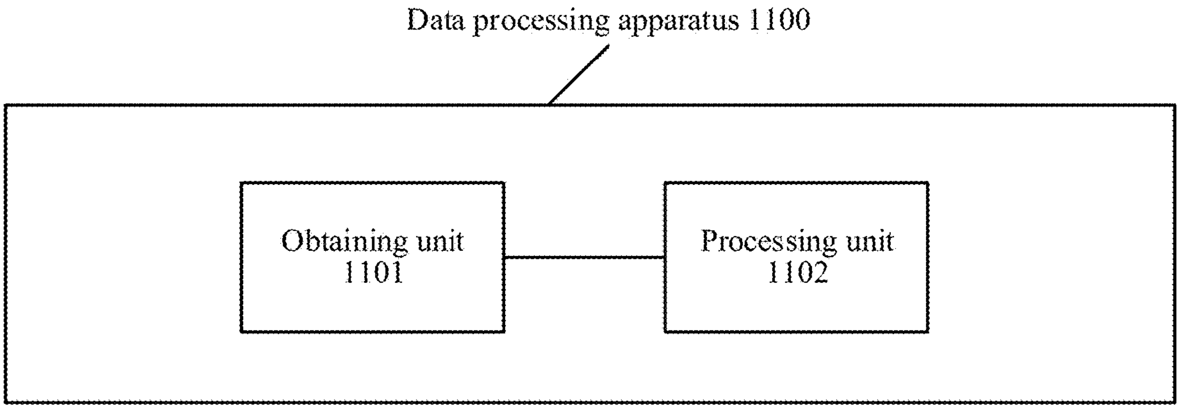
FIG. 11 is a schematic structural diagram of another data processing apparatus according to an embodiment of the present disclosure.

FIG. 11 is a schematic structural diagram of another data processing apparatus according to an embodiment of the present disclosure, The data processing apparatus 1100 may be applied to the computer device (for example, the consensus node) in the foregoing embodiments. The data processing apparatus 1100 may be a computer program (including program code) run on the computer device. For example, the data processing apparatus 1100 is application software. The data processing apparatus 1100 may be configured to execute corresponding steps in the data processing method according to the embodiments of the present disclosure. The data processing apparatus may 1100 include:

an obtaining unit 1101, configured to obtain a consensus-pending block transmitted by a packaging node, the consensus-pending block being generated after packaging, by the packaging node, a plurality of groups of transaction data to be processed, the consensus-pending block recording at least one group of first transaction data and at least one group of second transaction data, and the first transaction data being determined according to a transaction execution result of each group of transaction data after executing the plurality of groups of transaction data in parallel;

a processing unit 1102, configured to perform first consensus processing on each group of first transaction data in the consensus-pending block, to obtain a first transaction execution result of each group of first transaction data;

the processing unit 1102 being further configured to perform second consensus processing, different from the first consensus processing, on each group of second transaction data in the consensus-pending block, to obtain a second transaction execution result of each group of second transaction data; and the processing unit 1102 being further configured to combine the first transaction execution results and the second transaction execution results, to obtain a transaction combination execution result.

In one embodiment, after performing first consensus processing on each group of first transaction data in the consensus-pending block, to obtain a first transaction execution result of each group of first transaction data, the processing unit 1102 is further configured to perform the following operations:

performing validity verification on a first consensus processing process, and in response to that the verification fails, deleting the first transaction execution results and the second transaction execution results; and performing second consensus processing on the plurality of groups of transaction data, to obtain a transaction execution result of each group of transaction data.

In one embodiment, the processing unit 1102 performs validity verification on a first consensus processing process, and is configured to perform the following operations:

traversing a transaction read cache of the second transaction data, to obtain a read data set of the second transaction data, where the read data set is stored to the transaction read cache in form of a key-value pair;

performing a hashing operation on a read keyword of the second transaction data, to obtain a verification hash string of the target second transaction data; and performing matching processing on the verification hash string based on the first hash string stored in a Bloom filter, and in response to that the matching succeeds, determining that verification of the first consensus processing process succeeds.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
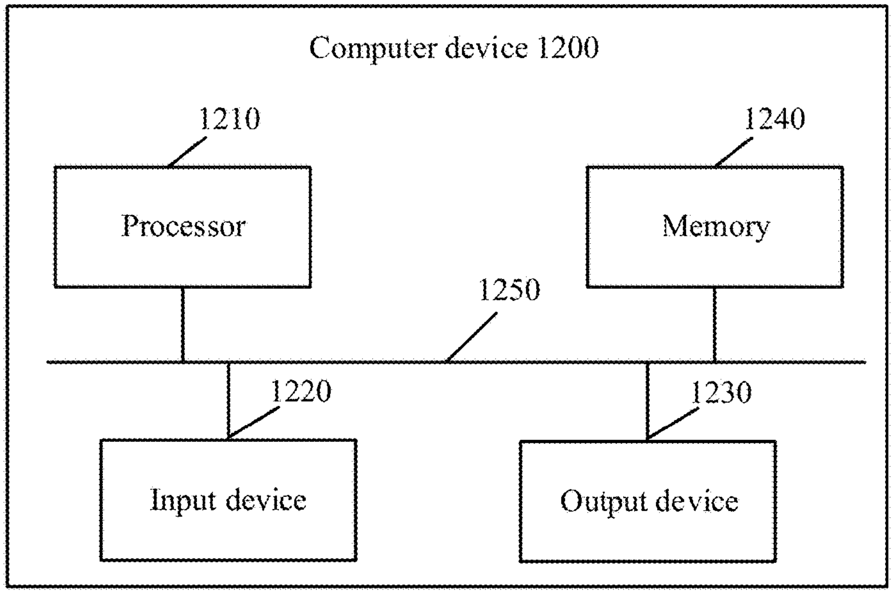
FIG. 12 is a schematic structural diagram of a computer device according to an embodiment of the present disclosure.

FIG. 12 is a schematic structural diagram of a computer device according to an embodiment of the present disclosure. The computer device 1200 is configured to execute the steps performed by the packaging node and the consensus nodes in the foregoing method embodiments. The computer device 1200 includes: one or more processors 1210; and one or more input devices 1220, one or more output devices 1230, and a memory 1240. The processor 1210, the input device 1220, the output device 1230, and the memory 1240 are connected by a bus 1250. The memory 1240 is configured to store a computer program. The computer program includes program instructions. The processor 1210 is configured to invoke the program instructions stored in the memory 1240 to perform the steps in the data processing method.

An embodiment of the present disclosure also provides a computer storage medium. The computer storage medium stores computer-readable instructions. A processor, when executing the foregoing computer-readable instructions, can perform the method in the foregoing corresponding embodiments. For technical details not disclosed in the embodiment of the computer storage medium involved in the present disclosure, refer to the description of the method embodiments of the present disclosure. In an example, the computer-readable instructions may be deployed on one computer device, or executed on a plurality of computer devices located at one site, or executed on a plurality of computer devices distributed at a plurality of sites and interconnected via a communication network.

An aspect of the present disclosure provides a computer program product. The computer program product includes computer-readable instructions, stored in a computer-readable storage medium. A processor of the computer device reads the computer-readable instructions from the computer-readable storage medium, and the processor executes the computer-readable instructions, so that the computer device can perform the method in the foregoing corresponding embodiments.

A person of ordinary skill in the art may understand that all or some of the processes of the methods in the embodiments may be implemented by a computer program instructing relevant hardware. The program may be stored in a computer-readable storage medium. During execution of the program, the procedures of the method embodiments are performed. The storage medium may include a magnetic disc, an optical disc, a read-only memory (Read-Only Memory, ROM), a random access memory (Random Access Memory, RAM), or the like.

The descriptions are merely some embodiments of the present disclosure, and are not intended to limit the scope of the present disclosure, which certainly cannot be used to limit the scope of the rights of the present disclosure. Therefore, equivalent modifications made according to the claims of the present disclosure still fall within the scope of the present disclosure.

What is claimed is:

1. A data processing method, executed by a computer device, comprising:

obtaining a plurality of groups of transaction data to be processed;

determining, from the plurality of groups of transaction data according to transaction execution results of the plurality of groups of transaction data, at least one group of first transaction data that meets a preset execution condition, wherein the determining the at least one group of the first transaction data that meets the preset execution condition comprises: obtaining, for each group of transaction data, a write keyword from a corresponding transaction write cache and performing a hashing operation on the write keyword to obtain a first hash string of the group of transaction data; writing the first hash string of each group of transaction data to a Bloom filter; traversing a read data set of each group of transaction data from a corresponding transaction read cache and performing a hashing operation on a read keyword of each group of transaction data to obtain a second hash string of the group of transaction data; and matching the second hash string of each group of transaction data with each first hash string in the Bloom filter to determine, according to a matching result, the at least one group of the first transaction data that meets the preset execution condition and at least one group of second transaction data that does not meet the preset execution condition, and wherein determining, according to the matching result, the at least one group of the first transaction data and the at least one group of the second transaction data comprises: in response to a second hash string of a first group of transaction data not matching any first hash string in the Bloom filter, determining that the first group of transaction data does not have read data written by another group of transaction data among the plurality of groups of transaction data and determining the first group of transaction data to be the first transaction data that meets the preset execution condition; and in response to a second hash string of a second group of transaction data matching one of first hash strings in the Bloom filter, determining that the second group of transaction data has read data written by another group of transaction data among the plurality of groups of transaction data, determining the second group of transaction data to be the second transaction data that does not meet the preset execution condition, and determining that the second transaction data needs to be executed after the other group of transaction data corresponding to the matched first hash string;

packaging the plurality of groups of transaction data, to generate a consensus-pending block, the consensus-pending block recording the at least group of first transaction data and at least one group of second transaction data, and the second transaction data being transaction data different from the first transaction data among the plurality of groups of transaction data;

performing first consensus processing on the first transaction data, and performing second consensus processing, different from the first consensus processing, on the second transaction data, wherein the first consensus processing comprises parallel consensus processing, the second consensus processing comprises serial consensus processing, the first consensus processing on the first transaction data is prioritized over the second consensus processing on the second transaction data; and adding the consensus-pending block to a blockchain in response to a successful completion of the first consensus processing and the second consensus processing, wherein the added consensus-pending block becomes a new block of the blockchain.

2. The method according to claim 1, wherein the consensus-pending block records the first transaction data and the second transaction data based on a differential record rule, and the differential record rule comprises: an arrangement rule and a label setting rule; and the packaging the plurality of groups of transaction data, to generate the consensus-pending block comprises:

packaging the plurality of groups of transaction data according to the arrangement rule, to generate the consensus-pending block, a group of the at least one group of the second transaction data in the consensus-pending block being provided with a target label, and the target label being set based on the label setting rule, wherein the first consensus processing and the second consensus processing are performed after packaging the plurality of groups of transaction data based on the arrangement rule.

3. The method according to claim 1, wherein the method further comprises:

creating the corresponding transaction read cache and transaction write cache for each group of transaction data in the plurality of groups of transaction data, wherein the transaction read cache corresponding to the transaction data is configured to store the read data set of the transaction data, the read data set being applied in invoking a smart contract and executing the transaction data; and the transaction write cache corresponding to the transaction data is configured to store the write data set of the transaction data, the write data set storing a transaction execution result obtained after invoking the smart contract and executing the transaction data.

4. The method according to claim 3, wherein the method further comprises:

obtaining a read data set of target transaction data from the transaction read cache, and based on invoking information in the read data set of the target transaction data, obtaining a target smart contract for executing the target transaction data, wherein the target transaction data is from the plurality of groups of transaction data; and invoking the target smart contract to execute the target transaction data, to obtain a target transaction execution result, wherein the target transaction execution result is applied in obtaining the write data set of the target transaction data.

5. The method according to claim 4, wherein the transaction execution result of each group of transaction data is stored to the corresponding transaction write cache in a form of a key-value pair, and the read data set of each group of transaction data is stored to the corresponding transaction read cache in a form of a key-value pair, wherein the write keyword refers to a key in the key-value pair corresponding to the transaction execution result, and wherein the read keyword refers to a key in the key-value pair corresponding to the read data set.

6. The method according to claim 1, wherein the method further comprises:

executing the at least one group of second transaction data in series, to obtain second transaction execution results of the second transaction data;

obtaining first transaction execution results of the at least one group of first transaction data from the transaction execution results of the plurality of groups of transaction data; and combining the first transaction execution results and the second transaction execution results, to obtain a transaction combination execution result.

7. The method according to claim 6, wherein the method further comprises:

performing validity verification on the first consensus processing process, and in response to that the verification fails, deleting the first transaction execution results and the second transaction execution results; and performing the second consensus processing on the plurality of groups of transaction data, to obtain the transaction execution results of the plurality of groups of transaction data.

8. The method according to claim 7, wherein the performing validity verification on the first consensus processing process comprises:

traversing a transaction read cache of the second transaction data, to obtain a read data set of the second transaction data, wherein the read data set is stored to the transaction read cache in a form of a key-value pair;

performing a hashing operation on a read keyword of the second transaction data, to obtain a verification hash string of the second transaction data; and performing matching processing on the verification hash string based on the first hash string stored in a Bloom filter, and in response to the matching succeeding, determining that verification of the first consensus processing process succeeds.

9. A data processing apparatus, comprising:

at least one memory and one or more processors, the at least one memory storing computer-readable instructions, and the computer-readable instructions, when executed by the one or more processors, causing the one or more processors to implement:

obtaining a plurality of groups of transaction data to be processed;

determining, from the plurality of groups of transaction data according to transaction execution results of the plurality of groups of transaction data, at least one group of first transaction data that meets a preset execution condition, wherein the determining the at least one group of the first transaction data that meets the preset execution condition comprises: obtaining, for each group of transaction data, a write keyword from a corresponding transaction write cache and performing a hashing operation on the write keyword to obtain a first hash string of the group of transaction data; writing the first hash string of each group of transaction data to a Bloom filter; traversing a read data set of each group of transaction data from a corresponding transaction read cache and performing a hashing operation on a read keyword of each group of transaction data to obtain a second hash string of the group of transaction data; and matching the second hash string of each group of transaction data with each first hash string in the Bloom filter to determine, according to a matching result, the at least one group of the first transaction data that meets the preset execution condition and at least one group of second transaction data that does not meet the preset execution condition, and wherein determining, according to the matching result, the at least one group of the first transaction data and the at least one group of the second transaction data comprises: in response to a second hash string of a first group of transaction data not matching any first hash string in the Bloom filter, determining that the first group of transaction data does not have read data written by another group of transaction data among the plurality of groups of transaction data and determining the first group of transaction data to be the first transaction data that meets the preset execution condition; and in response to a second hash string of a second group of transaction data matching one of first hash strings in the Bloom filter, determining that the second group of transaction data has read data written by another group of transaction data among the plurality of groups of transaction data, determining the second group of transaction data to be the second transaction data that does not meet the preset execution condition, and determining that the second transaction data needs to be executed after the other group of transaction data corresponding to the matched first hash string;

packaging the plurality of groups of transaction data, to generate a consensus-pending block, the consensus-pending block recording the at least group of first transaction data and at least one group of second transaction data, and the second transaction data being transaction data different from the first transaction data among the plurality of groups of transaction data;

performing first consensus processing on the first transaction data, and performing second consensus processing, different from the first consensus processing, on the second transaction data, wherein the first consensus processing comprises parallel consensus processing, the second consensus processing comprises serial consensus processing, the first consensus processing on the first transaction data is prioritized over the second consensus processing on the second transaction data; and adding the consensus-pending block to a blockchain in response to a successful completion of the first consensus processing and the second consensus processing, wherein the added consensus-pending block becomes a new block of the blockchain.

10. The apparatus according to claim 9, wherein the consensus-pending block records the first transaction data and the second transaction data based on a differential record rule, and the differential record rule comprises: an arrangement rule and a label setting rule; and the packaging the plurality of groups of transaction data, to generate the consensus-pending block comprises:

packaging the plurality of groups of transaction data according to the arrangement rule, to generate the consensus-pending block, a group of the at least one group of the second transaction data in the consensus-pending block being provided with a target label, and the target label being set based on the label setting rule, wherein the first consensus processing and the second consensus processing are performed after packaging the plurality of groups of transaction data based on the arrangement rule.

11. The apparatus according to claim 9, wherein the one or more processors are further configured to perform:

creating the corresponding transaction read cache and transaction write cache for each group of transaction data in the plurality of groups of transaction data, wherein the transaction read cache corresponding to the transaction data is configured to store the read data set of the transaction data, the read data set being applied in invoking a smart contract and executing the transaction data; and the transaction write cache corresponding to the transaction data is configured to store the write data set of the transaction data, the write data set storing a transaction execution result obtained after invoking the smart contract and executing the transaction data.

12. The apparatus according to claim 11, wherein the one or more processors are further configured to perform:

obtaining a read data set of target transaction data from the transaction read cache, and based on invoking information in the read data set of the target transaction data, obtaining a target smart contract for executing the target transaction data, wherein the target transaction data is from the plurality of groups of transaction data; and invoking the target smart contract to execute the target transaction data, to obtain a target transaction execution result, wherein the target transaction execution result is applied in obtaining the write data set of the target transaction data.

13. The apparatus according to claim 12, wherein the transaction execution result of each group of transaction data is stored to the corresponding transaction write cache in a form of a key-value pair, and the read data set of each group of transaction data is stored to the corresponding transaction read cache in a form of a key-value pair, wherein the write keyword refers to a key in the key-value pair corresponding to the transaction execution result, and wherein the read keyword refers to a key in the key-value pair corresponding to the read data set.

14. The apparatus according to claim 9, wherein the one or more processors are further configured to perform:

executing the at least one group of second transaction data in series, to obtain second transaction execution results of the second transaction data;

obtaining first transaction execution results of the at least one group of first transaction data from the transaction execution results of the plurality of groups of transaction data; and combining the first transaction execution results and the second transaction execution results, to obtain a transaction combination execution result.

15. The apparatus according to claim 14, wherein the one or more processors are further configured to perform:

performing validity verification on the first consensus processing process, and in response to that the verification fails, deleting the first transaction execution results and the second transaction execution results; and performing the second consensus processing on the plurality of groups of transaction data, to obtain the transaction execution results of the plurality of groups of transaction data.

16. One or more non-transitory computer-readable storage media, storing computer-readable instructions, and the computer-readable instructions, when executed by one or more processors, causing the one or more processors to perform:

obtaining a plurality of groups of transaction data to be processed;

determining, from the plurality of groups of transaction data according to transaction execution results of the plurality of groups of transaction data, at least one group of first transaction data that meets a preset execution condition, wherein the determining the at least one group of the first transaction data that meets the preset execution condition comprises: obtaining, for each group of transaction data, a write keyword from a corresponding transaction write cache and performing a hashing operation on the write keyword to obtain a first hash string of the group of transaction data; writing the first hash string of each group of transaction data to a Bloom filter; traversing a read data set of each group of transaction data from a corresponding transaction read cache and performing a hashing operation on a read keyword of each group of transaction data to obtain a second hash string of the group of transaction data; and matching the second hash string of each group of transaction data with each first hash string in the Bloom filter to determine, according to a matching result, the at least one group of the first transaction data that meets the preset execution condition and at least one group of second transaction data that does not meet the preset execution condition, and wherein determining, according to the matching result, the at least one group of the first transaction data and the at least one group of the second transaction data comprises: in response to a second hash string of a first group of transaction data not matching any first hash string in the Bloom filter, determining that the first group of transaction data does not have read data written by another group of transaction data among the plurality of groups of transaction data and determining the first group of transaction data to be the first transaction data that meets the preset execution condition; and in response to a second hash string of a second group of transaction data matching one of first hash strings in the Bloom filter, determining that the second group of transaction data has read data written by another group of transaction data among the plurality of groups of transaction data, determining the second group of transaction data to be the second transaction data that does not meet the preset execution condition, and determining that the second transaction data needs to be executed after the other group of transaction data corresponding to the matched first hash string;

packaging the plurality of groups of transaction data, to generate a consensus-pending block, the consensus-pending block recording the at least group of first transaction data and at least one group of second transaction data, and the second transaction data being transaction data different from the first transaction data among the plurality of groups of transaction data;

performing first consensus processing on the first transaction data, and performing second consensus processing, different from the first consensus processing, on the second transaction data, wherein the first consensus processing comprises parallel consensus processing, the second consensus processing comprises serial consensus processing, the first consensus processing on the first transaction data is prioritized over the second consensus processing on the second transaction data; and adding the consensus-pending block to a blockchain in response to a successful completion of the first consensus processing and the second consensus processing, wherein the added consensus-pending block becomes a new block of the blockchain.

* * * * *